United States Patent [19]

Takeshima

[11] Patent Number: 5,365,734
[45] Date of Patent: Nov. 22, 1994

[54] NOX PURIFICATION APPARATUS FOR AN INTERNAL COMBUSTION ENGINE

[75] Inventor: Shinichi Takeshima, Susono, Japan

[73] Assignee: Toyota Jidosha Kabushiki Kaisha, Tokyo, Japan

[21] Appl. No.: 34,070

[22] Filed: Mar. 22, 1993

[30] Foreign Application Priority Data

| Mar. 25, 1992 | [JP] | Japan | 4-097387 |
| Mar. 25, 1992 | [JP] | Japan | 4-097388 |
| Apr. 6, 1992 | [JP] | Japan | 4-112445 |

[51] Int. Cl.$^5$ ............................................. F01N 3/10
[52] U.S. Cl. ........................................ 60/288; 60/286; 60/301; 422/176; 422/196
[58] Field of Search ................ 60/288, 286, 301; 422/176, 196

[56] References Cited

U.S. PATENT DOCUMENTS

| 3,181,923 | 5/1965 | Frilette et al. |  |
| 3,282,046 | 11/1966 | Walker et al. |  |
| 4,438,627 | 3/1984 | Gotoh et al. |  |
| 4,597,262 | 7/1986 | Retallick | 60/311 |
| 4,867,953 | 9/1989 | Riekert et al. | 423/239 |
| 5,089,236 | 2/1992 | Clerc | 60/286 |
| 5,125,231 | 6/1992 | Patil et al. |  |

FOREIGN PATENT DOCUMENTS

| 1205980 | 6/1986 | Canada. |
| 0433772 | 6/1992 | European Pat. Off.. |
| 1413228 | 8/1965 | France. |
| 1-262311 | 10/1989 | Japan. |
| 3074515 | 3/1991 | Japan. |
| 3242415 | 11/1991 | Japan. |

*Primary Examiner*—Richard R. Cole
*Assistant Examiner*—L. Heyman
*Attorney, Agent, or Firm*—Kenyon & Kenyon

[57] ABSTRACT

A plurality of lean NOx catalysts are installed in passages of a dual passage portion of an exhaust conduit of an internal combustion engine. A space velocity changing means including a valve is provided at a connecting portion of the passages so that the amount of exhaust gas flowing through the lean NOx catalysts is altered periodically. When a space velocity of exhaust gas at the lean NOx catalyst changes from a low velocity to a high velocity, an NOx purification rate of the lean NOx catalyst increases momentarily. By repeatedly generating the NOx purification rate increased conditions, the NOx purification rate of the NOx purification apparatus including the plurality of lean NOx catalysts is greatly increased.

12 Claims, 11 Drawing Sheets

SHORT PERIOD AND LARGE AMPLITUDE

LONG PERIOD AND SMALL AMPLITUDE

FIG. 11

| ENGINE LOAD | \ ENGINE SPEED (RPM) | 1000 | 1500 | 2000 | 2500 | 3000 | 3500 | 4000 | 4500 | 5000 (SEC) |
|---|---|---|---|---|---|---|---|---|---|---|
| 100 | | 50 | 35 | 32 | 32 | 0 | 0 | 0 | 0 | 0 |
| 90 | | 65 | 45 | 40 | 40 | 33 | 32 | 30 | 0 | 0 |
| 80 | | 85 | 58 | 51 | 51 | 42 | 42 | 40 | 31 | 0 |
| 70 | | 98 | 90 | 65 | 65 | 52 | 52 | 50 | 41 | 0 |
| 60 | | 120 | 105 | 80 | 80 | 67 | 67 | 66 | 55 | 0 |
| 50 | | 0 | 120 | 105 | 105 | 83 | 83 | 82 | 67 | 0 |
| 40 | | 0 | 0 | 120 | 120 | 106 | 107 | 110 | 78 | 34 |
| 30 | | 0 | 0 | 0 | 0 | 120 | 120 | 120 | 110 | 45 |
| 20 | | 0 | 0 | 0 | 0 | 0 | 0 | 0 | 0 | 57 |
| 10 | | 0 | 0 | 0 | 0 | 0 | 0 | 0 | 0 | 79 |
| 0 | | 0 | 0 | 0 | 0 | 0 | 0 | 0 | 0 | 90 |

FIG. 12

100: ALL FLOWS THROUGH ONE PASSAGE
0: EVEN FLOW

| ENGINE LOAD | 1000 RPM | 2000 RPM | 3000 RPM | 4000 RPM | 5000 RPM |
|---|---|---|---|---|---|
| 100 | 80 | 95 | 0 | 0 | 0 |
|  | 70 | 90 | 95 | 0 | 0 |
|  | 60 | 80 | 90 | 95 | 0 |
|  | 50 | 70 | 80 | 90 | 0 |
|  | 40 | 60 | 70 | 80 | 0 |
|  | 0 | 50 | 60 | 70 | 95 |
|  | 0 | 40 | 50 | 60 | 90 |
|  | 0 | 0 | 40 | 50 | 80 |
|  | 0 | 0 | 0 | 40 | 70 |
| 0 | 0 | 0 | 0 | 0 | 60 |

ENGINE SPEED (RPM)

NOX PURIFICATION APPARATUS FOR AN INTERNAL COMBUSTION ENGINE

BACKGROUND OF THE INVENTION

1. Field of the Invention

The present invention relates to a nitrogen oxides (NOx) purification apparatus provided with a "lean" NOx catalyst which is defined as an NOx purification catalyst capable of purifying NOx under excess-oxygen conditions such as in exhaust gas from an internal combustion engine operated at lean air-fuel ratios.

2. Description of the Prior Art

To improve fuel economy and to suppress exhaust of carbon dioxide, thereby reducing global warming, engines capable of fuel combustion at lean air-fuel ratios (lean burn engines) are being developed and are in actual use today. Since a conventional catalyst (three-way catalyst) cannot reduce and purify NOx at lean air-fuel ratios, there is a need to develop a catalyst or system that can purify NOx even at lean air-fuel ratios.

Japanese Patent Publication HEI 1-139145 proposes a copper (Cu)/zeolite catalyst in which copper is exchanged on a zeolite carrier and which is capable of purifying NOx at lean air-fuel ratios in the presence of hydrocarbons (HC). To use such a lean NOx catalyst as an NOx purification apparatus for internal combustion engines, a system wherein the lean NOx catalyst can operate at a high NOx purification rate should be developed.

In this meaning, Japanese Patent Application HEI 2-317664 filed Nov. 26, 1990 proposes an exhaust gas purification system wherein two lean NOx catalysts are arranged in parallel with each other in an exhaust system of an internal combustion engine and exhaust gas flow is switched so that, when exhaust gas is flowing through one lean NOx catalyst, exhaust gas flow through the other lean NOx catalyst is stopped. When the exhaust gas flow is switched to flow through one of the two catalysts, the temperature of the one catalyst increases accompanied by a momentary increase in the NOx purification rate. By repeating switching of exhaust gas flow, the increase in the NOx purification rates is repeatedly produced so that the NOx purification rate of the system increases.

However, it has been found in further tests that almost no increase in the NOx purification rate of the system is seen just after the space velocity of exhaust gas at the lean NOx catalyst changes from a low velocity to a high velocity such as occurs just after an idling condition changes to an acceleration condition. This is true even though the exhaust gas is merely switched between the two lean NOx catalysts.

This suggests that an NOx purification rate (NOx conversion) of a lean NOx catalyst is affected not only by a change in the catalyst temperature but also by a space velocity of exhaust gas at the catalyst.

SUMMARY OF THE INVENTION

An object of the present invention is to provide an NOx purification apparatus for an internal combustion engine wherein an NOx purification rate of a lean NOx catalyst is increased making good use of the effect that a change in the space velocity has on the NOx purification rate of the lean NOx catalyst.

The above-described object is achieved by an NOx purification apparatus for an internal combustion engine in accordance with the present invention. The apparatus in accordance with the present invention includes an internal combustion engine having an exhaust system, a plurality of lean NOx catalysts including a first lean NOx catalyst and a second lean NOx catalyst arranged in parallel with each other in the exhaust system of the internal combustion engine, and space velocity changing means for changing alternately and periodically a first velocity of exhaust gas at the first lean NOx catalyst and a second velocity of exhaust gas at the second lean NOx catalyst so that when the first velocity is high, the second velocity is low, and when the first velocity is low, the second velocity is high.

In tests executed by the inventors it has been found that when the space velocity of exhaust gas at a lean NOx catalyst (a ratio of the volume of exhaust gas to the volume of the catalyst) changes, the NOx purification rate of the lean NOx catalyst changes for a few minutes and then returns to the original NOx purification rate. More particularly, when the space velocity at the lean NOx catalyst changes from a high velocity to a low velocity, the NOx purification rate of the lean NOx catalyst is momentarily increased to a great extent, and when the space velocity at the lean NOx catalyst changes from a low velocity to a high velocity, the NOx purification of the lean NOx catalyst shows almost no change and in some cases is slightly decreased.

When the exhaust gas flow ratio is changed between a plurality of lean NOx catalysts arranged in parallel with each other, the NOx purification rate of the system increases. More particularly, the NOx purification rate of the system is increased when the space velocity at one of the lean NOx catalysts changes from a high velocity to a low velocity so that the NOx purification rate of the catalyst greatly increases, while the space velocity at another lean NOx catalyst changes from a low velocity to a high velocity so that the NOx purification rate of the catalyst slightly decreases. In this instance, since the magnitude of the increase in the $NO_x$ purification rate is greater than the magnitude of the decrease in the NOx purification rate, the total NOx purification rate of the system is improved.

The increase in the NOx purification rate of the system is seen for only a few minutes after the changing of the space velocity, and after these few minutes the NOx purification rate of the system returns to the original, normal NOx purification rate. By repeating the changing of the space velocity, the NOx purification rate increased conditions are repeatedly generated so that a high NOx purification rate of the system is obtained for a long period of time.

BRIEF DESCRIPTION OF THE DRAWING

The above-described object and other objects, features, and advantages of the present invention will become more apparent and will be more readily appreciated from the following detailed description of the preferred embodiments of the invention taken in conjunction with the accompanying drawings, in which:

FIG. 11 is a map used in determining a period of the space velocity alteration corresponding to an engine load and an engine speed in the third embodiment of the invention;

FIG. 12 is a map used in determining an amplitude of the space velocity alteration corresponding to an engine load and an engine speed in the third embodiment of the invention;

DETAILED DESCRIPTION OF THE PREFERRED EMBODIMENTS

Figure 5:
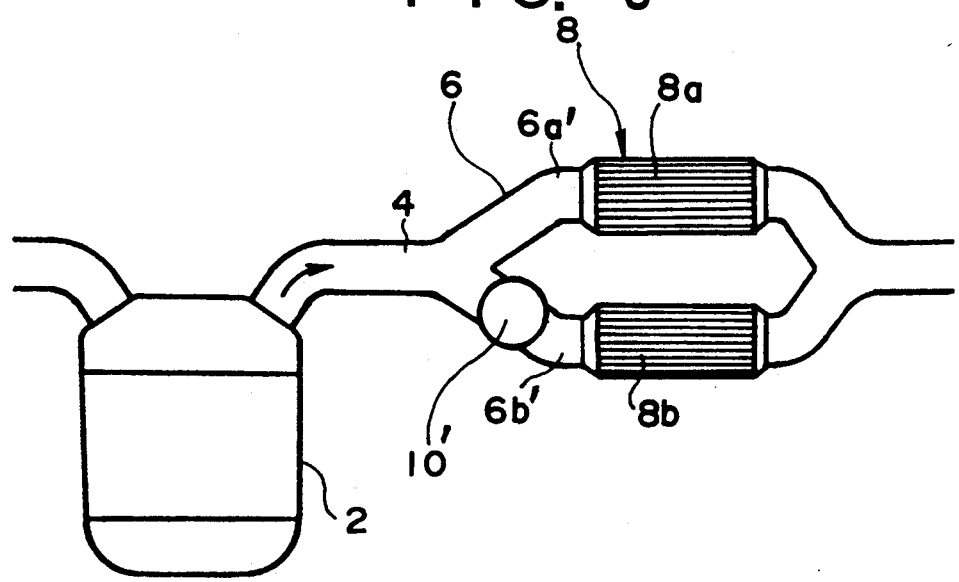
FIG. 5 is a schematic system diagram of an NOx purification apparatus for an internal combustion engine in accordance with a second embodiment of the present invention.

Four embodiments of the present invention will be described. The first embodiment is illustrated in FIGS. 1-4, the second embodiment is illustrated in FIG. 5, the third embodiment is illustrated in FIGS. 6-13, and the fourth embodiment is illustrated in FIGS. 14-18. Throughout all the embodiments, the same structural portions are denoted with the same reference numerals.

FIRST EMBODIMENT

Figure 1:
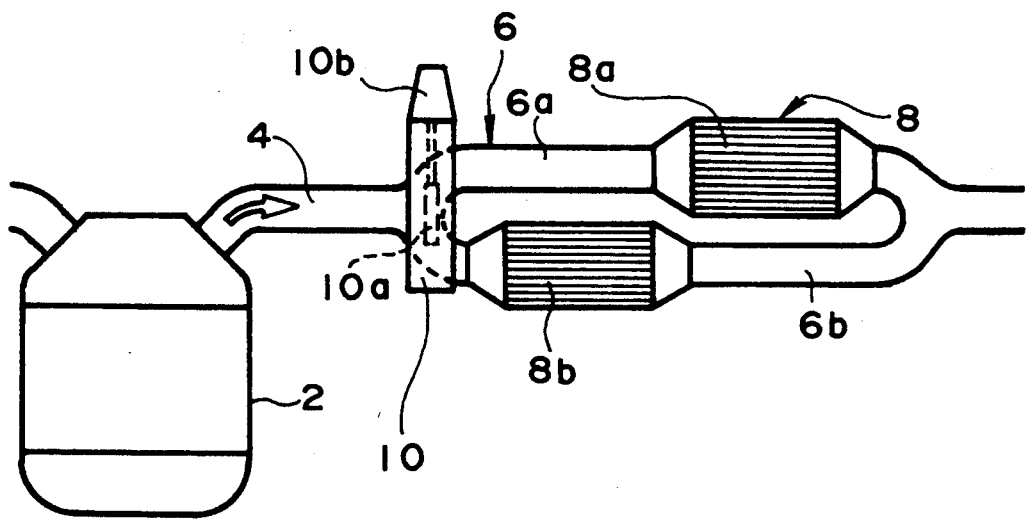
FIG. 1 is a schematic system diagram of an NO purification apparatus for an internal combustion engine in accordance with a first embodiment of the present invention.

As illustrated in FIG. 1, a dual passage portion 6 is provided in an exhaust conduit 4 of an internal combustion engine 2 capable of fuel combustion at lean air-fuel ratios (which may be a lean burn gasoline engine or a diesel engine). The dual passage portion includes a first passage 6a and a second passage 6b which are connected in parallel to each other. The dual passage portion 6 may be replaced by a plural passage portion which includes three or more passages.

Two lean NOx catalysts 8, that is, a first lean NOx catalyst 8a and a second lean NOx catalyst 8b are installed in the dual passage portion 6. More particularly, the first lean NOx catalyst 8a is installed in the first passage 6a and the second lean NOx catalyst 8b is installed in the second passage 6b. When the plural passage portion includes three or more passages, the lean NOx catalysts 8 are installed in respective passages, and the lean NOx catalysts are grouped into two groups, a first group of lean NOx catalysts 8a and a second group of lean NOx catalysts 8b.

Each lean NOx catalyst 8 preferably comprises a transition metal/zeolite catalyst which comprises a zeolite carrier on which at least one kind of transition metal is ion-exchanged. The transition metal is, for example, copper or cobalt.

A space velocity changing means 10 is installed in an upstream side connecting portion of the the passages 6a and 6b. The space velocity changing means 10 comprises a valve for changing alternately and periodically a first space velocity of exhaust gas at the first lean NOx catalyst 8a and a second space velocity of exhaust gas at the second lean NOx catalyst 8b so that when one velocity of the first and second space velocities is high, the other velocity is low, and when the one velocity changes to be low, the other velocity changes to be high.

More particularly, the space velocity changing means 10 includes a valve body 10a and an actuator 10b for moving the valve body 10a periodically. The valve body 10a does not close the first and second passages 6a and 6b perfectly so that some amount of exhaust gas is always flowing in the first and second passages 6a and 6b during operation of the engine. A first amount of exhaust gas flowing through the first passage 6a and a second amount of exhaust gas flowing through the second passage 6b alter periodically, but the total amount of the first amount and the second amount remains substantially constant.

Figure 2:
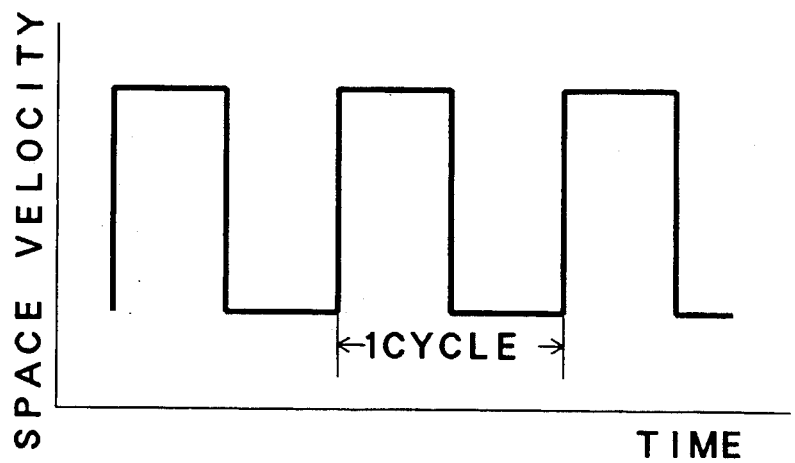
FIG. 2 is a space velocity versus time chart of the NOx purification apparatus of FIG. 1.
Figure 3:
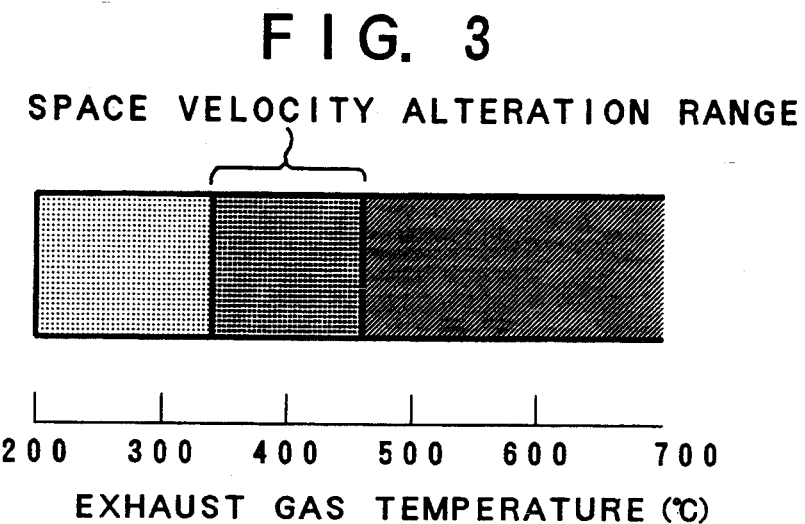
FIG. 3 is a chart illustrating a temperature range wherein the space velocity is allowed to be altered in the NOx purification apparatus of FIG. 1.
Figure 4:
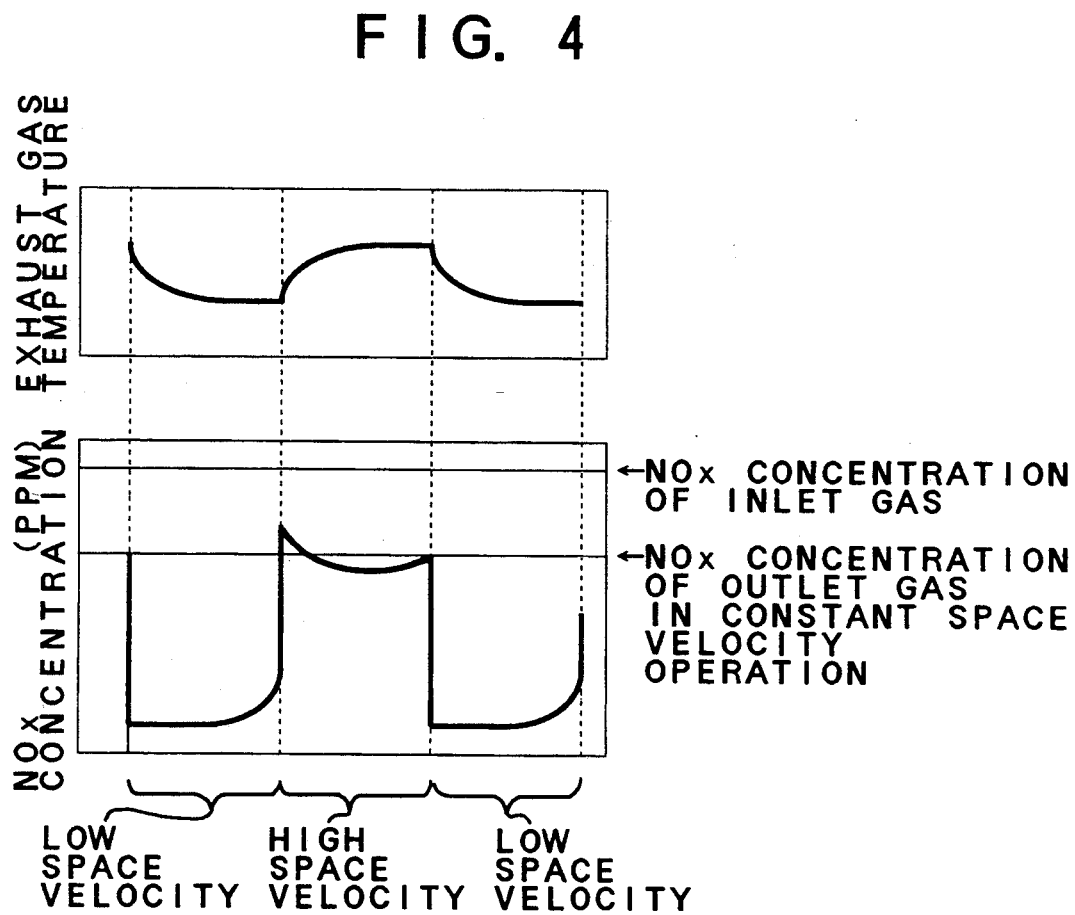
FIG. 4 is a graphical representation illustrating an NOx concentration and temperature versus time characteristic of the NOx purification apparatus of FIG. 1.

The alteration of the space velocity at each of the first lean NOx catalyst 8a and the second lean NOx catalyst 8b is shown in FIG. 2 in the case where the amount of exhaust gas exhausted from the internal combustion engine is constant. The space velocity alters periodically between a high space velocity and a low space velocity. When a large portion (for example, eighty percent) of exhaust gas flows through the first lean NOx catalyst 8a and the remaining twenty percent of exhaust gas flows through the second lean NOx catalyst 8b, the space velocity at the first lean NOx catalyst 8a is high and the space velocity at the second lean NOx catalyst 8b is low. In contrast, when a large portion (for example, eighty percent) of exhaust gas flows through the second lean NOx catalyst 8b and the remaining twenty percent of the exhaust gas flows through the first lean NOx catalyst 8a, the space velocity at the second lean NOx catalyst 8b is high and the space velocity at the first lean NOx catalyst 8a is low.

The cycle of the alteration of the space velocity is preferably set at about thirty seconds to two minutes. The space velocity is preferably altered only when the exhaust gas temperature at the catalyst is in the range of 330° C.–470° C. This is because significantly less increase in the NOx purification rate is seen if the alteration of the space velocity is conducted at temperatures outside this range.

The space velocity changing means 10 may be replaced by fluidics means. More particularly, control flow supply ports for supplying small amounts of flow may be provided in opposite side surfaces of the upstream side connecting portion of the passages 6a and 6b so that the main flow of exhaust gas passing through the connecting portion is controlled by the control flow. In the control, the characteristic that the exhaust gas tends to flow along the side surface of the passage when the control flow to the side surface is cut (Coanda effect), is utilized.

The space velocity changing means 10 may alternatively be provided at a downstream side connecting portion of the first passage 6a and the second passage 6b.

Operation of the first embodiment will now be explained.

It has been found by the inventor that when the space velocity at the lean NOx catalyst 8 changes, the NOx purification rate of the lean NOx catalyst 8 also causes a change which continues for a few minutes.

More particularly, when the space velocity of exhaust gas at a lean NOx catalyst 8 changes from a high velocity to a low velocity, the NOx purification rate of the lean NOx catalyst 8 temporarily increases to a great extent. Contrarily, when the space velocity of exhaust at the lean NOx catalyst 8 changes from a low velocity to a high velocity, the NOx purification rate of the lean NOx catalyst 8 shows almost no increase and in some cases decreases slightly.

The reason why the NOx purification rate of the lean NOx catalyst 8 increases when the space velocity changes to a low velocity is thought to be as follows: Since, at high velocity, exhaust gas flows through the catalyst without sufficiently contacting the surface of porosities of the catalyst, activated points on the surface of the catalyst tend not to be excessively consumed so that the number of the activated points increases temporarily when the velocity is high. However, when the space velocity changes from the high velocity to a low velocity, exhaust gas sufficiently contacts the surface of porosities of the catalyst and consumes the activated points which have increased during the high space velocity operation. As a result, the NOx purification rate of the lean NOx catalyst temporarily increases. When the exhaust gas has consumed almost all of the activated points, the NOx purification rate of the lean NOx catalyst returns to the original NOx purification rate of the normal condition. The reason why the NOx purification rate of the lean NOx catalyst 8 does not increase when the space velocity changes to a high velocity is thought to be as follows: Since the activated points of the lean NOx catalyst are not generated during a low space velocity operation, the NOx purification rate of the lean NOx catalyst does not improve even if the space velocity changes from a low velocity to a high velocity. In some cases, the NOx purification rate may decrease.

The space velocity of the first lean NOx catalyst 8a changes to a low space velocity while the space velocity at the second lean NOx catalyst 8b changes to a high velocity, and vice versa. Since the NOx purification rate increasing effect is larger than the NOx purification rate decreasing effect, the NOx purification rate of the total system improves.

For example, when a first condition where eighty percent of exhaust gas flows through the first lean NOx catalyst 8a and the remaining twenty percent of exhaust gas flows through the second lean NOx catalyst 8b changes to a second condition where twenty percent of exhaust gas flows through the first lean NOx catalyst 8a and the remaining eighty percent of exhaust gas flows through the second lean NOx catalyst 8b, suppose that the NOx purification rate of the first lean NOx catalyst 8a momentarily changes from 45% to 85% and that the NOx purification rate of the second lean NOx catalyst 8b changes from 45% to 42%. The NOx purification rate of the total system increases due to the increase in the NOx purification rate of the first lean NOx catalyst 8a by a first amount: $(85\% - 45\%) \times 0.2 = 8\%$, and decreases due to the decrease in the NOx purification rate of the second lean NOx catalyst 8b by a second amount: $(42\% - 45\%) \times 0.8 = -2.4\%$. As a result, the NOx purification rate of the total system increases by the amount: $8\% - 2.4\% = 5.6\%$.

SECOND EMBODIMENT

As illustrated in FIG. 5, the dual passage portion 6 of the exhaust conduit 4 of the internal combustion engine includes a first passage 6a' and a second passage 6b' which are connected in parallel to each other. A space velocity changing means 10' is installed in one of the passages 6a' and 6b', for example in the passage 6b'. The space velocity changing means 10' comprises a valve which varies the amount of exhaust gas flowing through the passage 6b'. However, the valve 10' does not completely close the passage 6b'. Therefore, some amount of exhaust gas always flows through the passage 6b'. The amount of exhaust gas flowing through the second passage 6b' can vary from fifty percent to about twenty percent of the total amount of exhaust gas, while the amount of exhaust gas flowing through the first passage 6a' can vary from fifty percent to about eighty percent of the total amount of exhaust gas. Other structure and operation of the second embodiment are the same as that of the first embodiment.

THIRD EMBODIMENT

Figure 6:
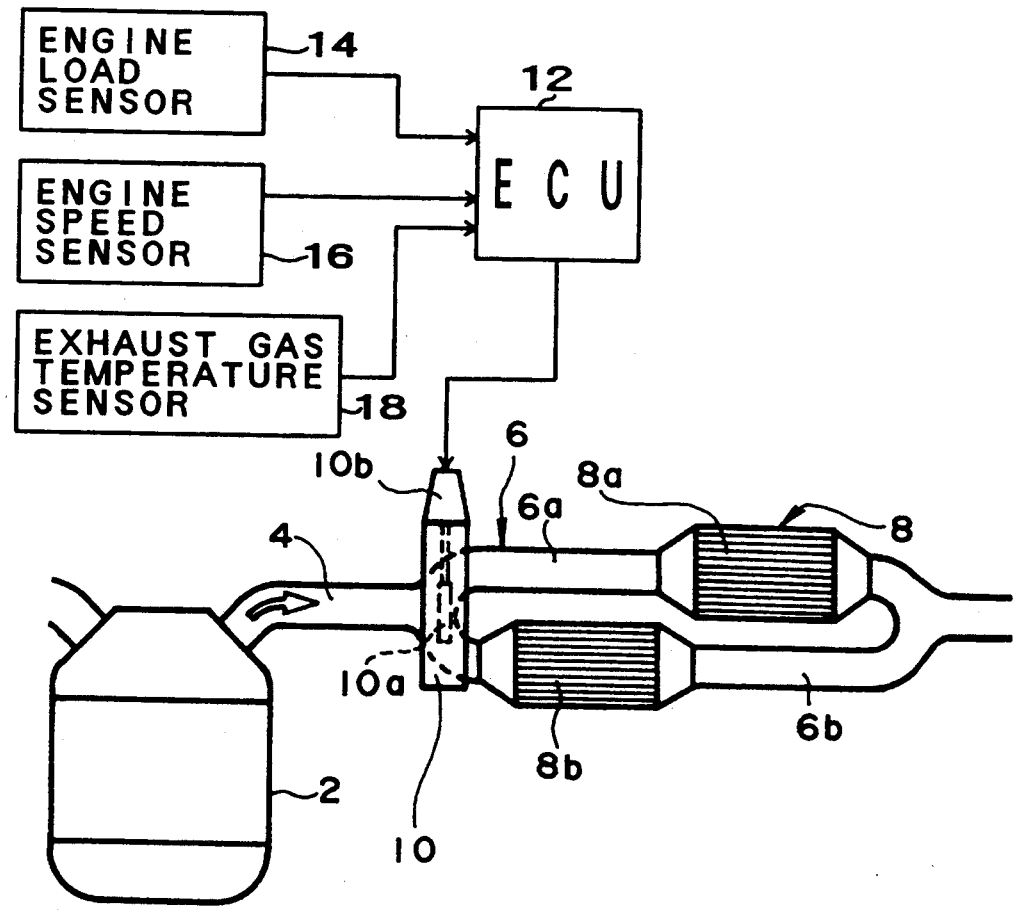
FIG. 6 is a schematic system diagram of an NOx purification apparatus for an internal combustion engine in accordance with a third embodiment of the present invention.

As illustrated in FIG. 6, an NOx purification apparatus for an internal combustion engine of the third embodiment of the invention includes all structures of the apparatus of the first embodiment of the inventions. The apparatus of the third embodiment of the invention further includes a space velocity changing means control means for controlling the space velocity changing means so that when an exhaust gas temperature is high, a space velocity changing interval is short, and when the exhaust gas temperature is low, the space velocity changing interval is longer. The space velocity changing means control means may control not only the space velocity changing interval but also a space velocity alteration amplitude. The space velocity changing means control means preferably comprises the control routine of FIG. 9 and maps of FIGS. 10 to 12, which are stored in a memory of a computer.

More specifically, as illustrated in FIG. 6, the NOx purification apparatus of the third embodiment includes an electronic control unit (ECU) 12. The apparatus includes an engine load sensor 14, an engine speed sensor 16, and an exhaust gas temperature sensor 18, outputs of which are fed to the ECU 12. The actuator 10b of the valve 10 is electrically connected to the ECU 12 so that the valve 10 is operated in accordance with instructions from the ECU 12.

The ECU 12 comprises an electronic computer. The computer includes an input interface which receives the outputs of the sensors 14, 16 and 18, an output sending the instructions from the ECU to the actuator 10b, a read only memory (ROM) storing the control routine of FIG. 9 and the maps of FIGS. 10 to 12, a random access memory (RAM), and a central processor unit (CPU) for executing calculations using the control routine and the maps.

Figure 7:
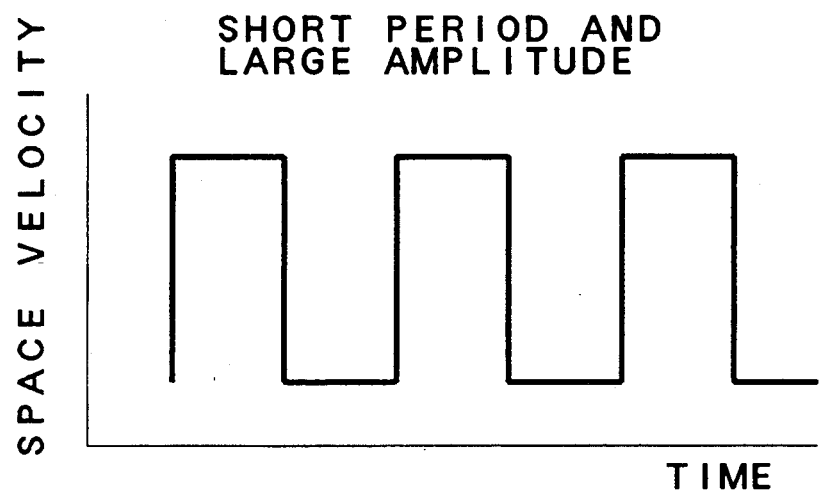
FIG. 7 is a diagram illustrating a space velocity changing pattern at high exhaust gas temperatures, of the NOx purification apparatus of FIG. 6.
Figure 8:
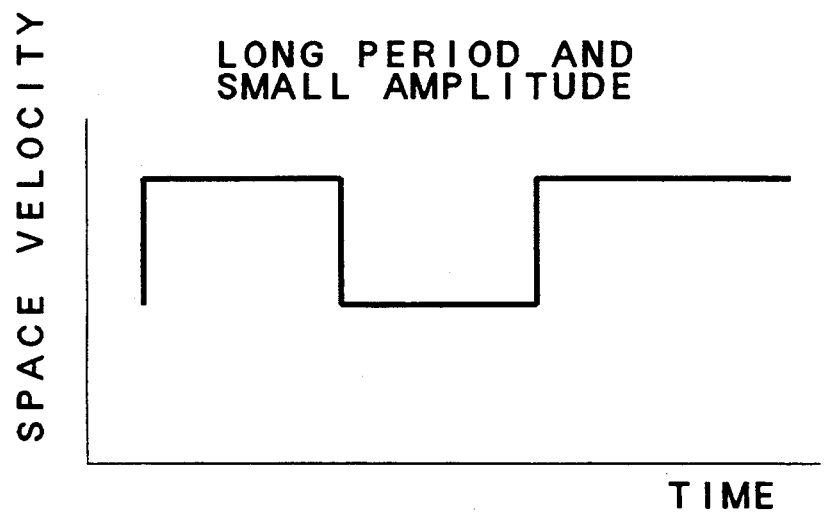
FIG. 8 is a diagram illustrating a space velocity changing pattern at low exhaust gas temperatures, of the NOx purification apparatus of FIG. 6.

As illustrated in FIGS. 7 and 8, the period of the space velocity alteration cycle is set to be short, for example thirty seconds to one minute, at a high temperature portion within the predetermined temperature range (330° C.–470° C.), and the period is set to be long, for example one minute to two minutes, at a low temperature portion within the predetermined temperature range.

Further, as illustrated in FIGS. 7 and 8, the amplitude of the space velocity alteration is set to be large, for example so as to be altered between 95% and 5%, at a high temperature portion within the predetermined temperature range (330° C.–470° C.), and the amplitude is set to be small, for example so as to be altered between 60% and 40% at a low temperature portion within the predetermined temperature range.

Figure 9:
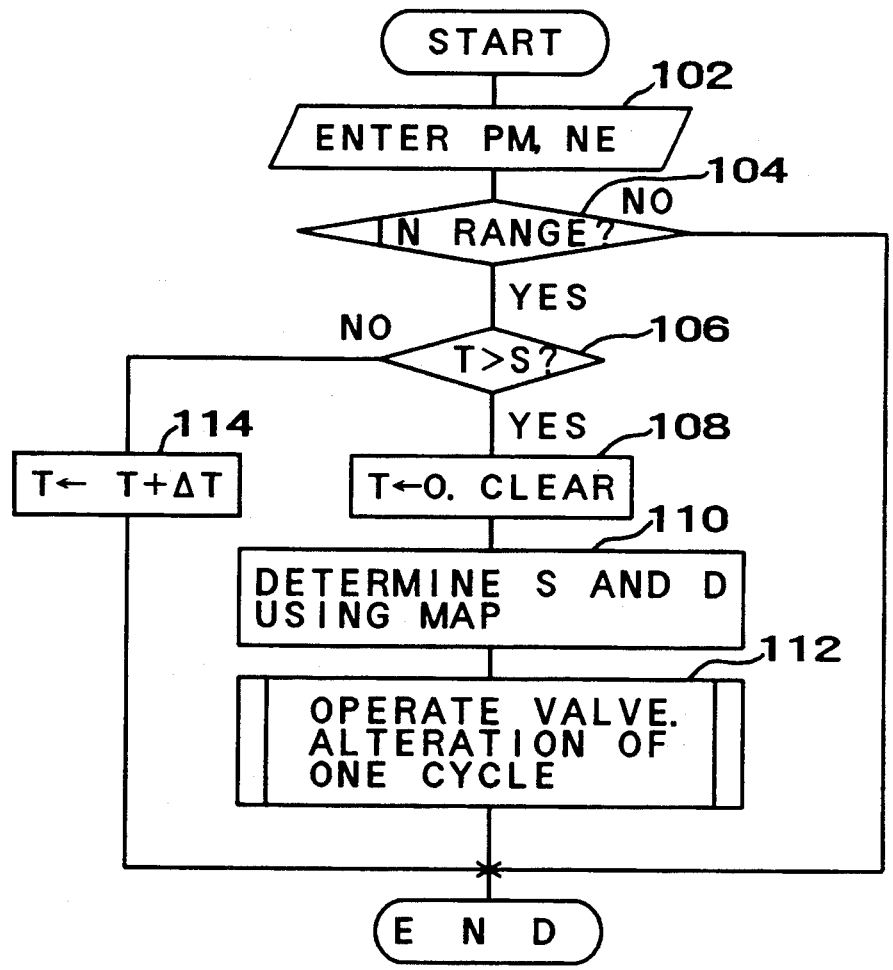
FIG. 9 is a flow chart of a space velocity changing means control means of the NOx purification apparatus of FIG. 6.
Figure 10:
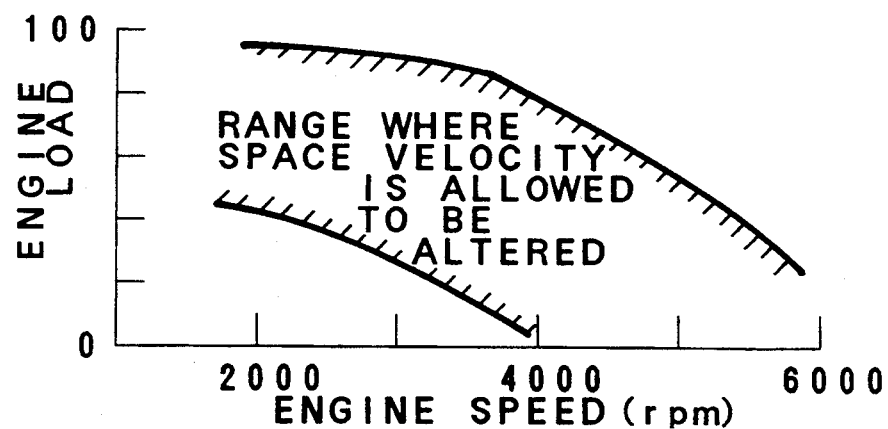
FIG. 10 is a graphical representation illustrating a range wherein the space velocity is allowed to be altered in the NOx purification apparatus of FIG. 6.
Figure 13:
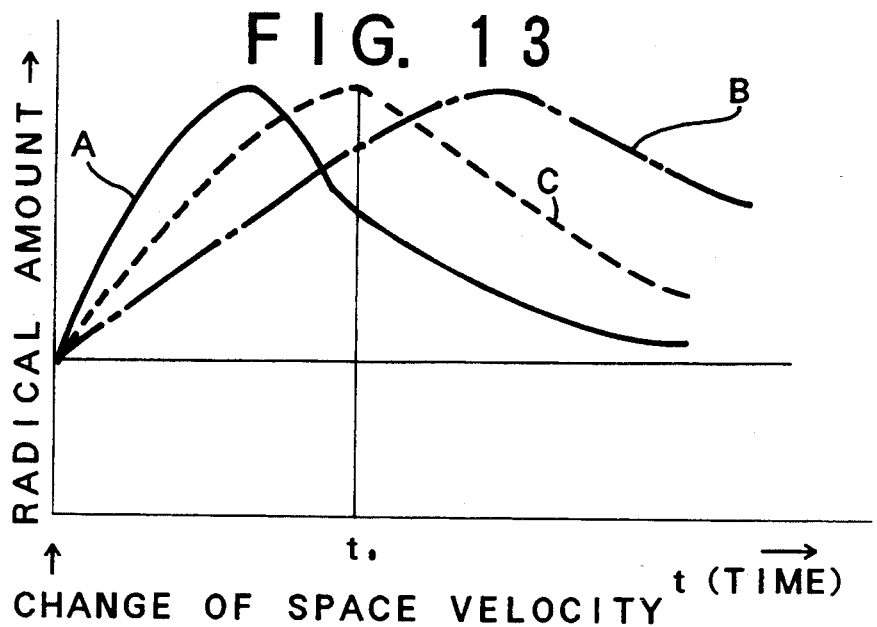
FIG. 13 is a graphical representation of a radical amount versus time characteristic when the space velocity is altered in the third embodiment of the invention.

The space velocity changing means 10 is controlled in accordance with instructions from the ECU 12 so that the above-described space velocity changing patterns of FIGS. 7 and 8 are obtained. More particularly, the control routine of FIG. 9 is entered at predetermined intervals. At step 102, a current engine load PM, which is the output of the engine load sensor 14, and a current engine speed NE, which is the output of the engine speed sensor 16, are entered. Then, at step 104, a decision is made using the map of FIG. 9 as to whether the current engine operating condition is in a space velocity control range. If the current engine operating condition is in the space velocity control range, the routine proceeds to step 106, and if the current engine operating conditions is not in the space velocity control range, the routine proceeds to an end step where the cycle ends. The exhaust gas temperature is high when PM and NE are high, and the exhaust gas temperature is low when PM and NE are low. When the current exhaust gas temperature is out of the predetermined temperature range, it is difficult to increase the NOx purification rate of the lean NOx catalyst even if the space velocity is altered. Therefore, only when the current exhaust gas temperature is within the predetermined temperature range of FIG. 10, the routine proceeds to step 106 so that the space velocity is altered.

At step 106, a decision is made as to whether or not the previous space velocity alteration cycle has ended, that is, whether or not the time (T) which has been counted since the beginning of the previous space velocity alteration cycle has exceeded the previous space velocity alteration period (S). If T has not exceeded S, the routine proceeds to step 114 where the time (T) is increased by a predetermined time increment (delta T) per cycle. If T has exceeded S, the routine proceeds from step 106 to step 108 where the time (T) is cleared to zero.

The routine proceeds from step 108 to step 110 where the current space velocity alteration period (S) corresponding to the current engine load and engine speed is determined using the map of FIG. 11. As shown in the map of FIG. 11, in the predetermined engine operation range, the higher the engine load and the engine speed are, (that is, the higher the exhaust gas temperature is) the shorter the predetermined the space velocity alteration period (S), and the lower the engine load and the engine speed are, (that is, the lower the exhaust gas temperature is,) the longer the predetermined space velocity alteration period (S).

Further, at step 110, the current space velocity alteration amplitude (D) is also determined using the map of FIG. 12. As shown in the map of FIG. 12, in the predetermined engine operation range, the higher the engine load and the engine speed are, (that is, the higher the exhaust gas temperature is) the larger the predetermined space velocity alteration amplitude (D), and the lower the engine load and the engine speed are, (that is, the lower the exhaust gas temperature is) the lower the predetermined space velocity alteration amplitude (D).

Then, the routine proceeds to step 112 where the space velocity changing means 10 including the valve body 10a and the actuator 10b is driven so that the current one cycle of space velocity alteration is executed on the basis of the determined period (S) and amplitude (D). Then, the routine proceeds from step 112 to the end step where the cycle ends.

Operation of the third embodiment will now be explained. In the case where the space velocity alteration period and amplitude are constant independently of a change in the exhaust gas temperature (as in the first embodiment), the NOx purification rate improvement due to the alteration of the space velocity is seen only in the predetermined medium exhaust gas temperature range, and almost no NOx purification rate improvement is seen in the exhaust gas temperature ranges higher than and lower than the predetermined medium exhaust gas temperature range.

The reason is presumed to be as follows: FIG. 9 shows the relationship between the amount of radicals generated through partial oxidation of hydrocarbons at the lean NOx catalyst and the elapsed time since the space velocity of exhaust gas at the lean NOx catalyst changes from a high velocity to a low velocity. As seen from FIG. 9, in a high temperature range, radicals are relatively swiftly generated and consumed as shown by curve A, and in a low temperature range, radicals are relatively slowly generated and consumed as shown by curve B. Curve C shows the generation and consumption characteristic of radicals of a medium temperature range. If the period ($t_0$) of the space velocity alteration is set based on the characteristic of curve C, in a high exhaust gas temperature condition it is difficult to obtain a high NOx purification rate, because generated radicals are swiftly burned in the high temperature range and so the space velocity is altered in the condition of a small amount of radicals. In a low exhaust gas temperature range also, it is difficult to obtain a high NOx purification, because generation of radicals is slow and the space velocity is altered in a condition where radicals have not yet been generated sufficiently.

In the third embodiment of the invention, the period ($t_0$) of the space velocity alteration cycle is not constant. More particularly, when the exhaust gas temperature is high, the period is shifted to the right side in FIG. 13 to be shorter so that the period approaches the peak point of the amount of radicals at high exhaust gas temperatures. In contrast, when the exhaust gas temperature is low, the period is shifted to the left side in FIG. 13 to be longer so that the period approaches the peak point of the amount of radicals at low exhaust gas temperatures. As a result, a sufficient amount of radicals can be utilized both at high exhaust gas temperatures and at low exhaust gas temperatures so that a high NOx purification rate due to the space velocity alteration is maintained.

A similar effect can be obtained by controlling the amplitude of the space velocity alteration. In this instance, increasing the amplitude of the space velocity alteration corresponds to shortening the period of space velocity alteration cycle, because a large amplitude and a short period operate so as to promote generation of radicals. Also, decreasing the amplitude corresponds to lengthening the period, because a small amplitude and a long period operate so as to delay generation of radicals. Thus, when the exhaust gas temperature is high, the amplitude is controlled to be larger, and when the exhaust gas temperature is low, the amplitude is controlled to be small. As a result, a more sufficient amount of radicals is generated both at high exhaust gas temperatures and at low exhaust gas temperatures.

Controlling the period and amplitude of the space velocity alteration widens the exhaust gas temperature range wherein the NOx purification improvement effect due to the space velocity alteration is obtained as compared with the effective temperature range of the first embodiment.

FOURTH EMBODIMENT

Figure 14:
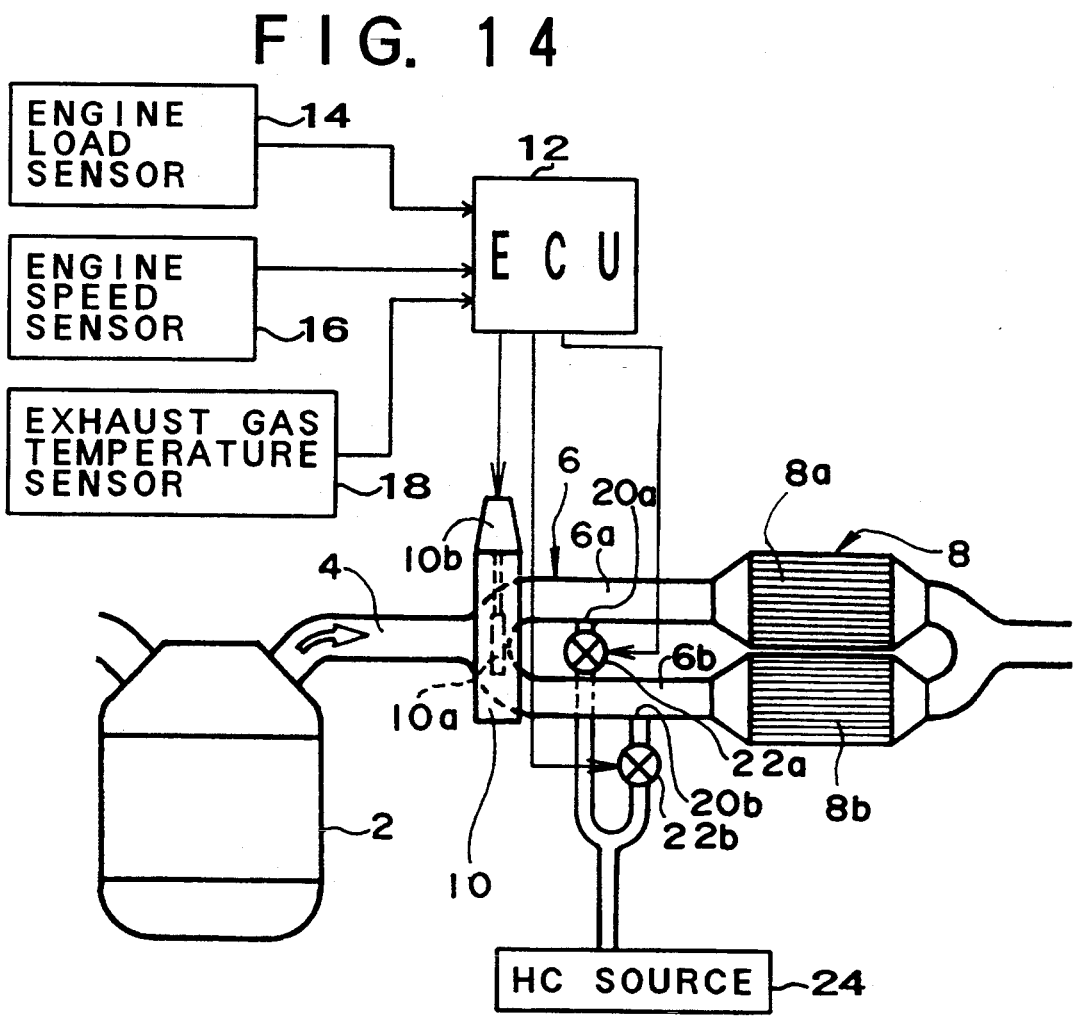
FIG. 14 is a schematic system diagram of an NOx purification apparatus for an internal combustion engine in accordance with a fourth embodiment of the invention.

As illustrated in FIG. 14, an NOx purification apparatus for an internal combustion engine of the fourth embodiment of the invention includes all structures of the apparatus of the third embodiment of the invention.

In addition to the same structures as those of the third embodiment, the apparatus of the fourth embodiment of the invention further includes: a plurality of HC injection means, provided upstream of lean NOx catalysts 8a and 8b, respectively, for injecting hydrocarbons into the passages 6a and 6b, respectively, of the exhaust conduit 4; and an HC injection means control means for controlling the HC injection means so that just before a space velocity of exhaust gas at one of the plurality of lean NOx catalysts 8a and 8b changes from a low velocity to a high velocity, hydrocarbons are injected momentarily into a portion of the exhaust conduit 4 upstream of the one lean NOx catalyst.

More particularly, as illustrated in FIG. 14, an HC injection means is provided to each passage 6a, 6b of the dual passage portion 6 of the exhaust conduit 4 for supplying HC into a portion of each passage 6a, 6b upstream of each lean NOx catalyst 8a, 8b. Each HC injection means includes an HC supply port 20a, 20b provided in a portion of each passage 6a, 6b upstream of each lean NOx catalyst 8a, 8b, an HC control valve 22a, 22b installed in a pipe connecting each HC supply port 20a, 20b to an HC source 24 (for example, an assembly of a fuel tank and a fuel pump) so that the HC control valve 22a, 22b turns the supply of HC on and off.

Figure 15:
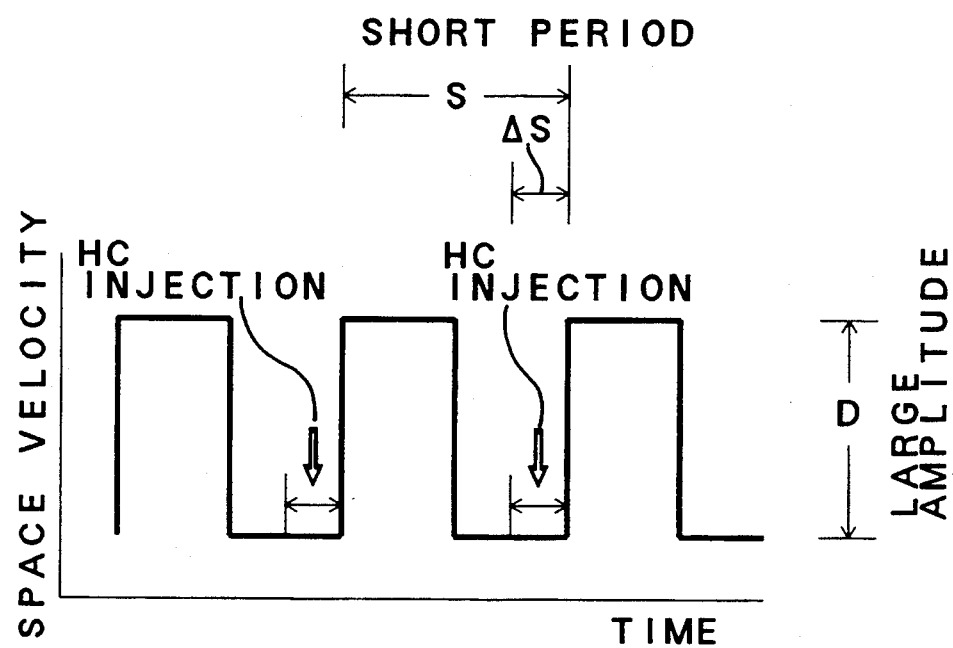
FIG. 15 is a diagram illustrating a space velocity changing pattern and an HC injection timing at high exhaust gas temperatures, of the apparatus of FIG. 14.
Figure 16:
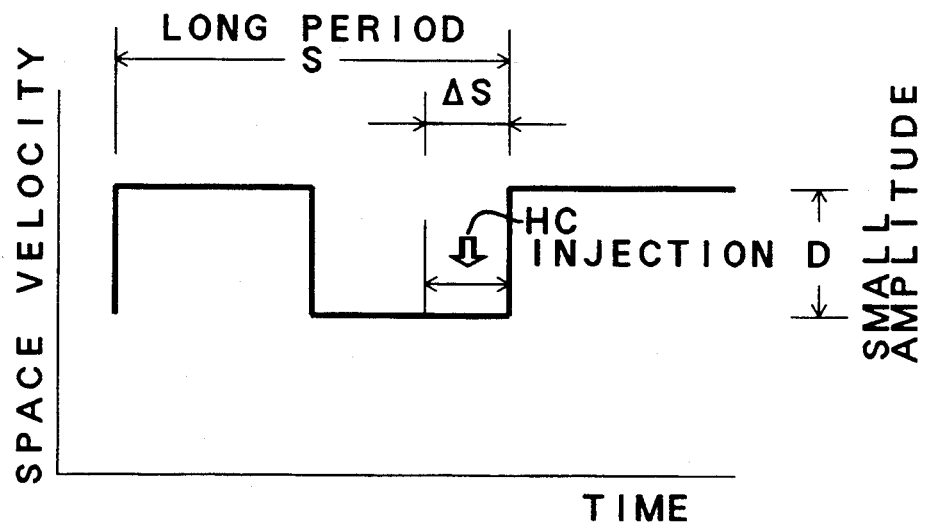
FIG. 16 is a diagram illustrating a space velocity changing pattern and an HC injection timing at low exhaust gas temperatures, of the apparatus of FIG. 14.
Figure 17:
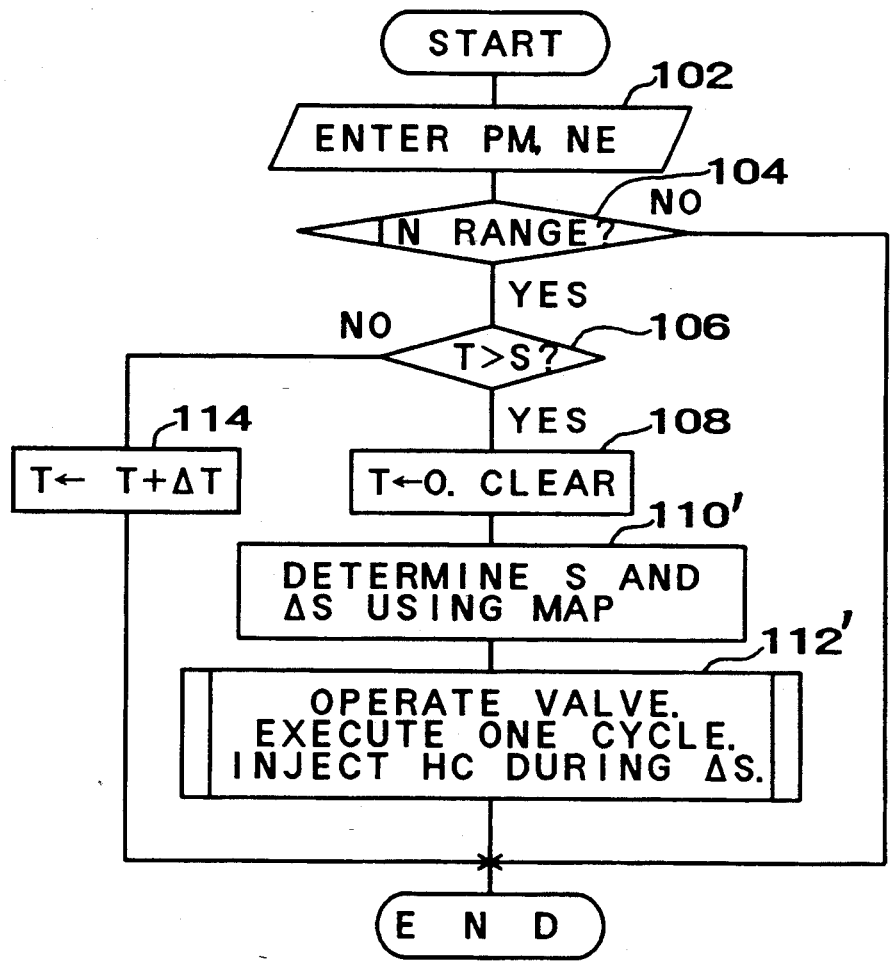
FIG. 17 is a flow chart of a space velocity changing means control means and an HC injection means control means of the NOx purification apparatus of FIG. 14.
Figure 18:
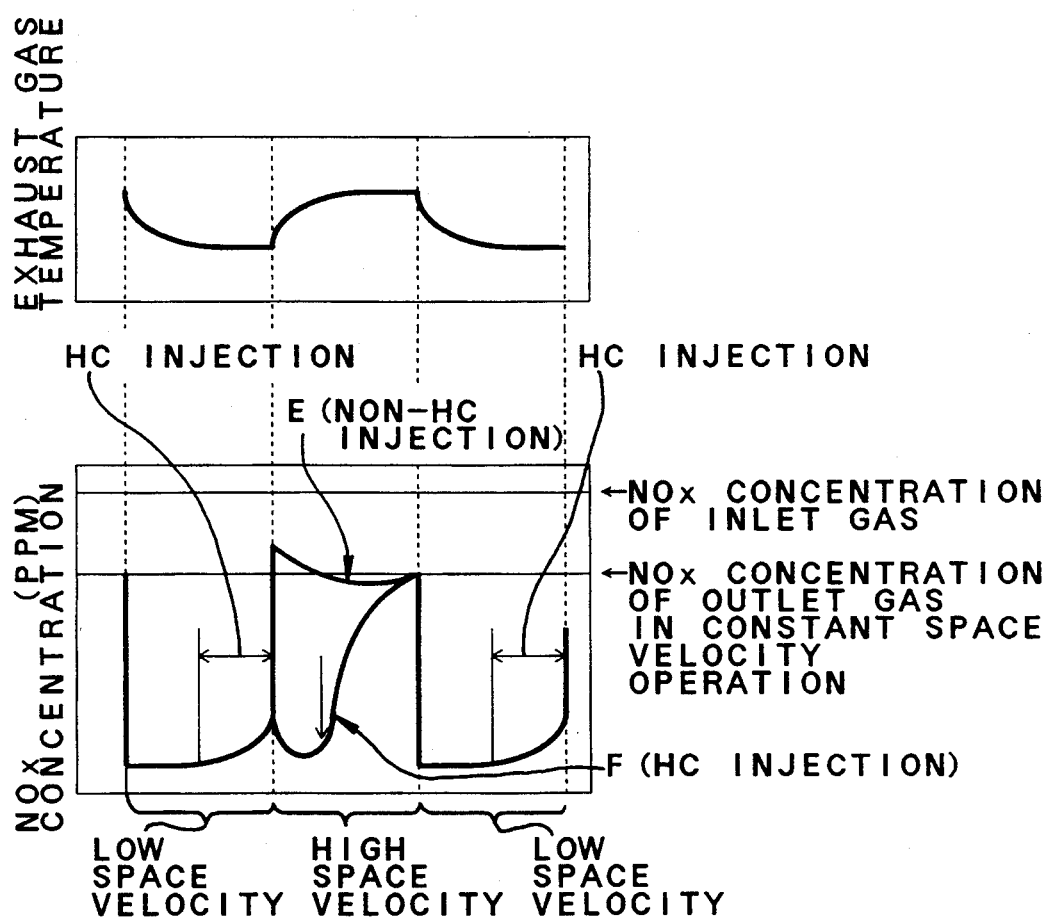
FIG. 18 is a graphical representation illustrating an NOx concentration characteristic and an HC injection timing of the NOx purification apparatus of FIG. 14.

The HC injection means control means controls each HC control valve 22a, 22b so that each HC control valve 22a, 22b opens to supply hydrocarbons to each passage 6a, 6b for a predetermined period of time just before the space velocity of exhaust gas at each lean NOx catalyst 8a, 8b changes from a low velocity to a high velocity. During other time periods, each HC control valve 22a, 22b closes to stop the supply of hydrocarbons. The period of supply of hydrocarbons varies in accordance with the length of the space velocity alteration cycle as shown in FIGS. 15 and 16. More particularly, the longer the space velocity alteration cycle (S), the longer the HC supply period (delta S).

The HC injection means control means is stored in the ECU 12. The HC injection means control means comprises a control routine of FIG. 17 which is stored in the ECU 12 and is the same as the routine of FIG. 9 (the third embodiment) except steps 110' and 112'. At step 110', in addition to calculation of the period S and the amplitude of the space velocity alteration, an HC supply period (data S) is determined. For example, the HC supply period is determined by the following equation:

$$delta\ S = d \times S$$

where, k is a factor selected from the range of 0.01 to 0.25. Then, the routine proceeds from step 110' to step 112'. At step 112', the space velocity is altered by controlling the space velocity changing means 10 (including the valve body 10a and the actuator 10b) based on the S and D determined at step 110'. Further, at step 112', hydrocarbons are injected for a period delta S into the upstream portion of the lean NOx catalyst just before the space velocity of the lean NOx catalyst is changed from a low velocity to a high velocity. Then, the routine proceeds from step 112' to the end step where the cycle ends.

Operation of the fourth embodiment of the invention includes all of the operation of the third embodiment of the invention. The fourth embodiment of the invention further includes the following operation: Since hydrocarbons are injected for a period of delta S into the portion of the passage upstream of the lean NOx catalyst just before the space velocity at the lean NOx catalyst changes from a low velocity to a high velocity, lack of hydrocarbons just after the space velocity changes from a low velocity to a high velocity is solved and the number of activated points of the lean NOx catalyst increases temporarily until the activated points generated due to the supply of HC are finally consumed. As a result, as shown by curve F in FIG. 18, the NOx concentration of the exhaust gas decreases and the NOx purification rate of the lean NOx catalyst increases temporarily to a great extent just after the space velocity at the lean NOx catalyst changes from a low velocity to a high velocity. In this instance, curve E shows the characteristic of the third embodiment of the invention where no hydrocarbons are injected into the exhaust conduit 4. The NOx purification rate of the lean NOx catalyst is improved in the fourth embodiment more than in the third embodiment.

Since the supply of hydrocarbons into the exhaust conduit in the fourth embodiment of the invention is momentary and not constant, the HC amount consumed in the HC injection is not too large.

In accordance with any embodiment of the invention, since the space velocity of exhaust gas at each lean NOx catalyst is altered periodically, the NOx purification rate of each lean NOx catalyst is increased repeatedly so that the NOx purification rate of the system including the lean NOx catalyst is greatly improved.

Although several embodiments of the invention have been described in detail above, those skilled in the art will appreciate that various modifications and alterations can be made to the particular embodiments shown without materially departing from the novel teachings and advantages of the present invention. Accordingly, all such modifications and alterations are included within the spirit and scope of the invention as defined by the following claims.

What is claimed is:

1. An NO$^x$ purification apparatus for an internal combustion engine comprising:
an internal combustion engine having an exhaust conduit;
a plurality of lean NO$_x$ catalysts including a first lean NO$_x$ catalyst and a second lean NO$_x$ catalyst arranged in parallel with each other in the exhaust conduit of the internal combustion engine;
space velocity changing means for periodically changing a first velocity of exhaust gas at the first lean NO$_x$ catalyst and a second velocity of exhaust gas at the second lean NO$_x$ catalyst so that when the first velocity is high, the second velocity is low, and when the first velocity is changed so that it is low, the second velocity is changed so that it is high, wherein the space velocity changing means operates so that, at all times while the engine is running, a first portion of the exhaust gas flows through the first lean NO$_x$ catalyst and a second portion of the exhaust gas flows through the second NO$_x$ catalyst.

2. An NOx purification apparatus for an internal combustion engine according to claim 1, wherein the exhaust conduit includes a dual passage portion having a first passage and a second passage, and the space velocity changing means comprises a valve installed in a connecting portion of the first passage and the second passage.

3. An NOx purification apparatus for an internal combustion engine according to claim 1, wherein the space velocity changing means alters the space velocity of exhaust gas at each lean NOx catalyst at a cycle from thirty seconds to two minutes in length.

4. An NOx purification apparatus for an internal combustion engine according to claim 1, wherein the space velocity changing means alters the space velocity of exhaust gas at each lean NOx catalyst only when an exhaust gas temperature at each lean NOx catalyst is in the range of 330° C.–470° C.

5. An NOx purification apparatus for an internal combustion engine according to claim 1, wherein the exhaust conduit includes a dual passage portion having a first passage and a second passage, and the space velocity changing means comprises a valve installed in only the first passage.

6. An NOx purification apparatus for an internal combustion engine according to claim 1, further comprising:
space velocity changing means control means for controlling the space velocity changing means so that when an exhaust gas temperature is high, a space velocity alteration cycle period is short, and when the exhaust gas temperature is low, the space velocity alteration cycle period is long.

7. An NOx purification apparatus for an internal combustion engine according to claim 6, wherein the space velocity changing means control means includes means for controlling the space velocity changing means so that when the exhaust gas temperature is high, a space velocity alteration amplitude is large, and when the exhaust gas temperature is low, the space velocity alteration amplitude is small.

8. An NOx purification apparatus for an internal combustion engine according to claim 6, wherein the space velocity changing means control means comprises an electronic computer storing a control routine and a map for controlling the space velocity.

9. An NOx purification apparatus for an internal combustion engine according to claim 8, further comprising an engine load sensor, an engine speed sensor, and an exhaust gas temperature sensor, outputs of which are fed to the computer.

10. An NOx purification apparatus for an internal combustion engine according to claim 1, further comprising:
a plurality of HC injection means, a respective HC injection means being provided upstream of each lean NOx catalyst, for injecting hydrocarbons into the exhaust conduit; and
HC injection means control means for controlling the HC injection means so that just before a space velocity of exhaust gas at one of the plurality of lean NOx catalysts changes from a low velocity to a high velocity, hydrocarbons are injected for a predetermined period of time into a portion of the exhaust conduit upstream of said one lean NOx catalyst by said respective HC injection means.

11. An NOx purification apparatus for an internal combustion engine according to claim 10, wherein each HC injection means includes:
an HC injection port provided upstream of a respective lean NOx catalyst;
an HC source;
an HC pipe connecting the HC injection port to the HC source; and
an HC valve installed in the HC pipe so as to open and close the HC pipe.

12. An NOx purification apparatus for an internal combustion engine according to claim 10, wherein the longer a space velocity alteration period is, the longer the predetermined time period of the hydrocarbon injection is.

* * * * *

UNITED STATES PATENT AND TRADEMARK OFFICE
CERTIFICATE OF CORRECTION

PATENT NO. : 5,365,734
DATED : November 22, 1994
INVENTOR(S) : Shinichi TAKESHIMA It is certified that error appears in the above-indentified patent and that said Letters Patent is hereby corrected as shown below:

Column 6, line 48, change "inventions" to --invention--.

Column 8, line 4, delete "the" between "predetermined" and "space".

Column 10, line 11, change "(data S)" to --(delta S)--.

Signed and Sealed this

Sixth Day of June, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT No. : 5,365,734

DATED : November 22, 1994

INVENTOR(S): S. Takeshima

It is certified that error appears in the above-identified patent and that said Letters Patent is hereby corrected as shown below:

Column 11, line 5, change "NO*" to --$NO_x$--

Signed and Sealed this

Fourth Day of June, 1996

Attest:

BRUCE LEHMAN

Attesting Officer

Commissioner of Patents and Trademarks